(12) United States Patent
Kitani

(10) Patent No.: US 7,551,790 B2
(45) Date of Patent: Jun. 23, 2009

(54) IMAGE CAPTURE APPARATUS CAPABLE OF CORRECTING CAPTURED IMAGE

(75) Inventor: Kazunari Kitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1043 days.

(21) Appl. No.: 11/092,248

(22) Filed: Mar. 29, 2005

(65) Prior Publication Data

US 2005/0231615 A1    Oct. 20, 2005

(30) Foreign Application Priority Data

Apr. 20, 2004    (JP) ............................. 2004-124407

(51) Int. Cl.
*G06K 9/00* (2006.01)
*H04N 1/04* (2006.01)
*H04N 1/40* (2006.01)
*H04N 5/335* (2006.01)
*H04N 5/232* (2006.01)

(52) U.S. Cl. ......................... 382/251; 358/448; 358/474

(58) Field of Classification Search ................. 382/312, 382/251, 253; 358/474, 400, 43, 448, 500, 358/505, 514, 426.11; 348/414, 422; 375/240.03, 375/240.22; 704/222, 230, 256.8
See application file for complete search history.

(56) References Cited

U.S. PATENT DOCUMENTS

| | | | | |
|---|---|---|---|---|
| 3,930,230 A | * | 12/1975 | Stephens | ..................... 382/134 |
| 5,081,342 A | * | 1/1992 | Knowles et al. | ............. 235/436 |
| 5,440,404 A | * | 8/1995 | Okamoto | ..................... 382/246 |
| 5,828,049 A | * | 10/1998 | Knowles et al. | ........ 235/462.01 |
| 5,981,968 A | * | 11/1999 | Nakazawa | ................... 250/587 |
| 6,299,065 B1 | * | 10/2001 | Knowles et al. | ........ 235/462.25 |
| 6,426,975 B1 | * | 7/2002 | Nishi et al. | ............ 372/240.13 |
| RE39,318 E | * | 10/2006 | Nishi et al. | ............ 375/240.13 |
| 2002/0085112 A1 | | 7/2002 | Hiramatsu et al. | |
| 2004/0032490 A1 | | 2/2004 | Uchida | |

FOREIGN PATENT DOCUMENTS

JP    2005311600    * 11/2005

* cited by examiner

Primary Examiner—Jerome Grant, II
(74) Attorney, Agent, or Firm—Canon U.S.A. Inc., I.P. Division

(57) ABSTRACT

An image capture apparatus includes a quantization precision selection device and an image data correction device. The quantization precision selection device selects a first quantization precision when an operation for reading out image data from an image sensor is performed a plurality of times for one exposure operation and selects a second quantization precision that is lower than the first quantization precision when an operation for reading out the image data from the image sensor is performed once for one exposure operation. The image data correction device performs correction processing of the image data using correction data having one of the first and second quantization precisions selected by the quantization precision selection device.

10 Claims, 10 Drawing Sheets

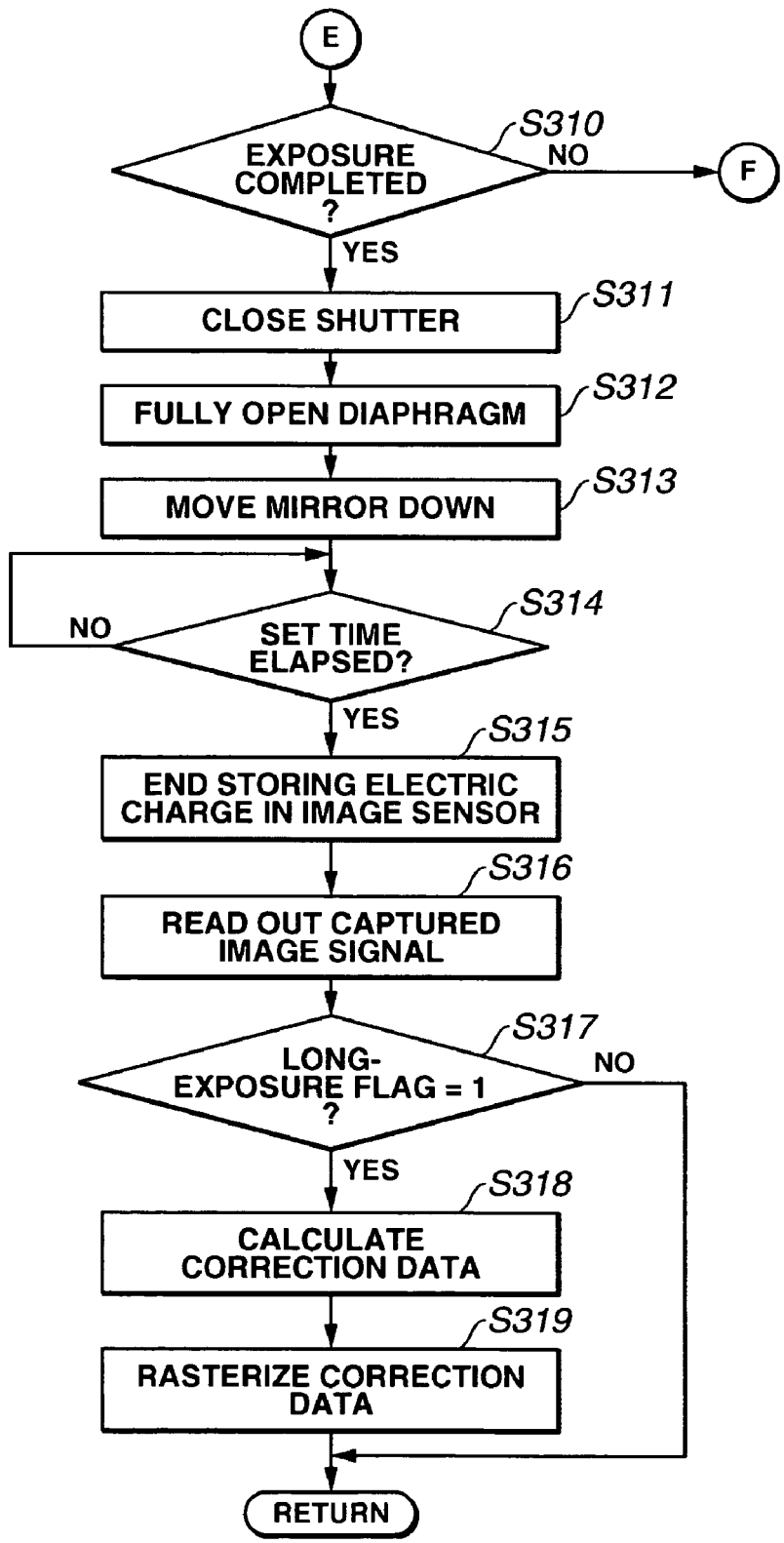

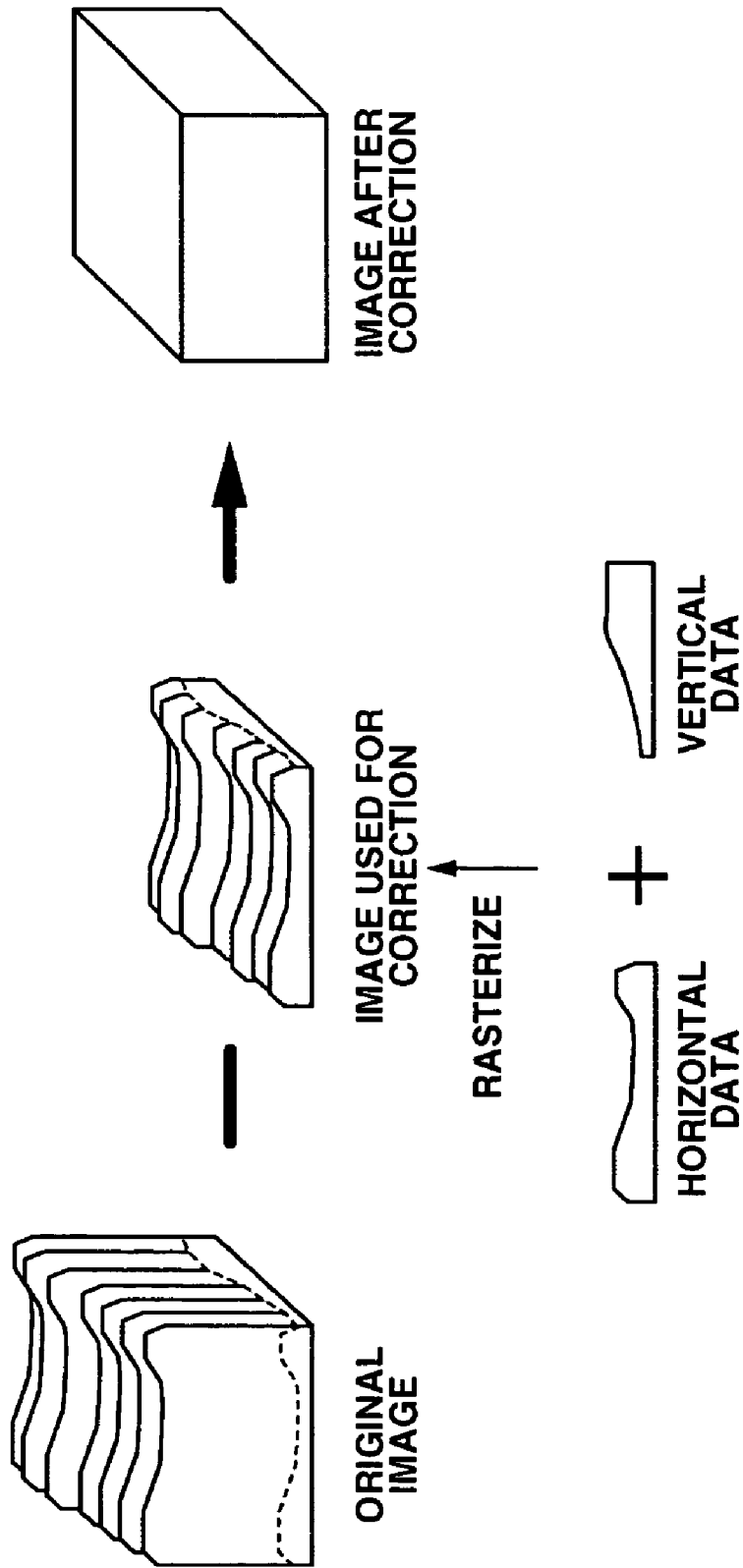

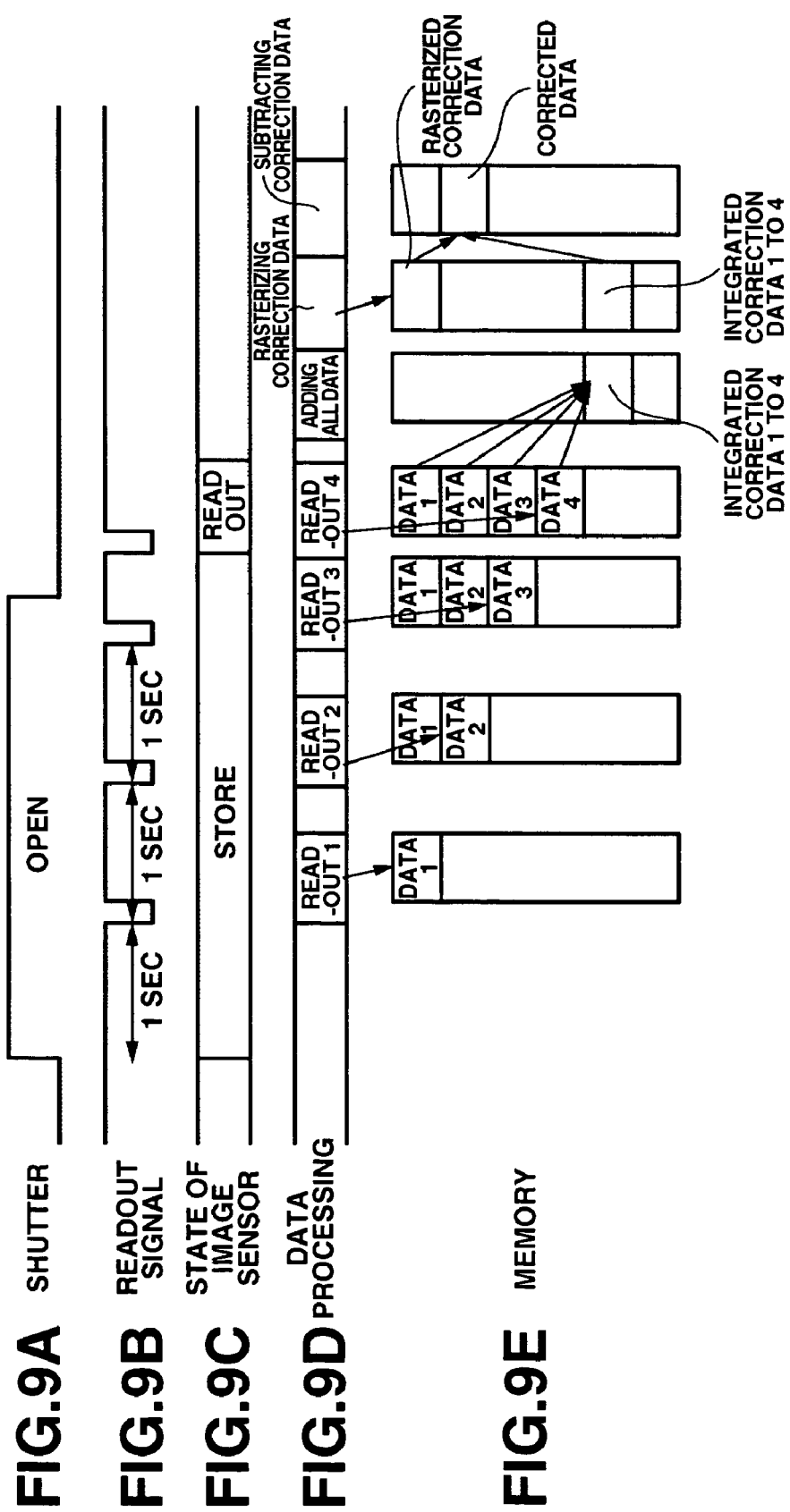

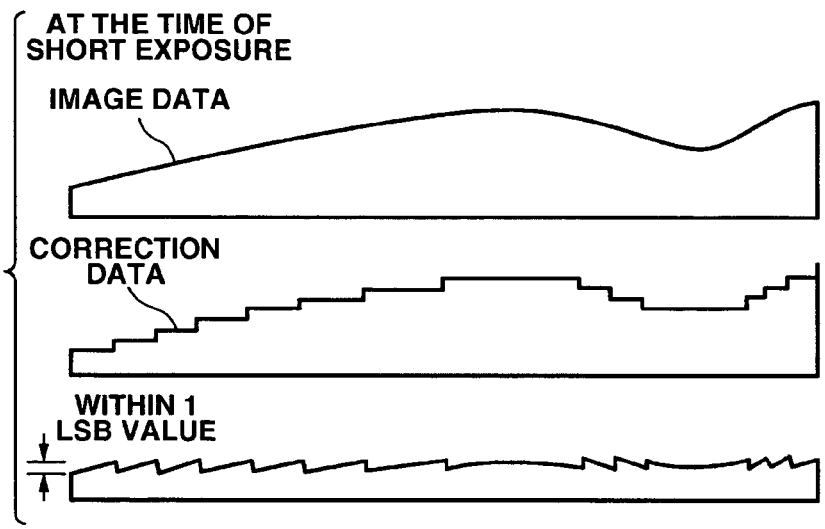
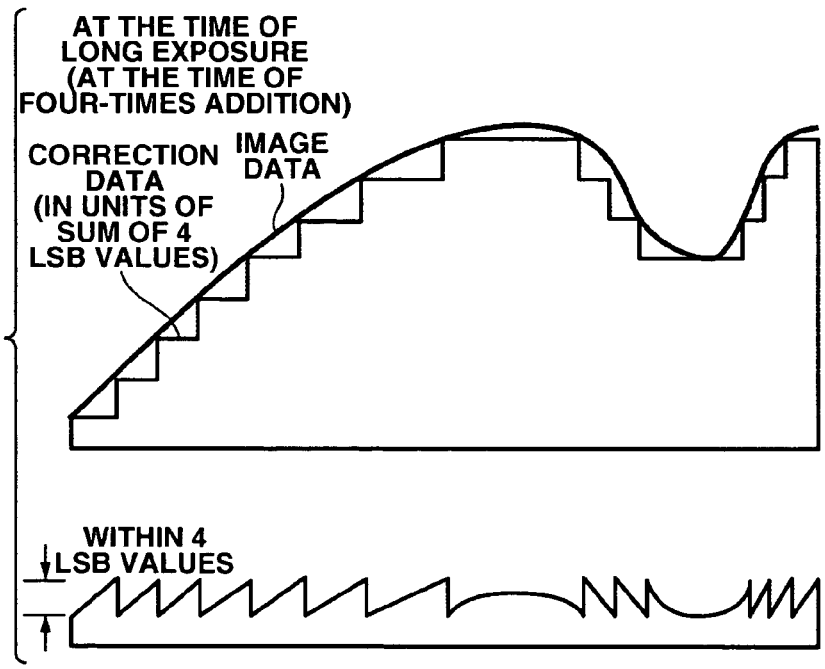
FIG.10A PRIOR ART
FIG.10B PRIOR ART

IMAGE CAPTURE APPARATUS CAPABLE OF CORRECTING CAPTURED IMAGE

BACKGROUND OF THE INVENTION

1. Field of the Invention

The present invention relates to an image capture apparatus, an image capture method, a computer program and a computer-readable recording medium for capturing, recording and reproducing a still image or a moving image, and more particularly to a technique for correcting a captured image.

2. Description of the Related Art

Image capture apparatuses, such as electronic cameras, that have been commercially available in recent years include an image capture apparatus that uses a memory card having a solid-state memory element as a recording medium. This type of image capture apparatus captures a still image or a moving image using a solid-state image sensor, such as a CCD (charge-coupled device) or a CMOS (complementary metal-oxide semiconductor) sensor, and records or reproduces the captured image on or from the memory card.

In capturing an image using a solid-state image sensor, such as a CCD or a CMOS sensor, the image capture apparatus is capable of performing dark noise correction. In the dark noise correction, an arithmetical operation is performed using dark image data and originally captured image data. The dark image data is read out from the image sensor after charge storage is performed in the same manner as in an exposure operation while the image sensor is not exposed to light. The originally captured image data is read out from the image sensor after charge storage is performed while the image sensor is exposed to light.

However, in the conventional image capture apparatus, a shutter release time lag is increased by a period of time required for obtaining dark image data, so that a user may miss an important photo opportunity.

Japanese Laid-Open Patent Application No. 2003-333434 discloses a horizontal dark shading correction method using one-dimensional correction data in order to provide an image capture apparatus, an image capture method, a program and a recording medium that are capable of preventing image quality deterioration by reducing a circuit system noise, i.e., a fixed pattern noise which is generated as dark offset by voltage fluctuations caused by the resistance component of a power line in an image sensor or variations of image sensors, while minimizing the number of times of obtaining dark image data.

When long exposure is performed, particularly, under the condition that an increase in a dark current component is not negligible, e.g., high temperature or high ISO sensitivity, it is necessary to limit an output voltage from an image sensor including a dark current to a range that does not exceed the dynamic range of an analog processing portion.

In order to solve the above problem, generally, the output level of an optical black portion of an image sensor is detected, and a clamping circuit using this level as black reference is employed.

Japanese Laid-Open Patent Application No. 2001-326850 discloses a method for solving the above problem by using an image capture system. In this image capture system, when an exposure time exceeds a predetermined time, readout from an image sensor is performed a plurality of times during a single exposure operation to obtain a plurality of video signals. The plurality of video signals are recorded on a recording medium. Then, a single video signal is created by performing an arithmetical operation on the recorded plurality of video signals.

However, the above-described image capture apparatus capable of performing horizontal dark shading correction has the following problem when long exposure is performed. Correction data used for horizontal dark shading correction is obtained as horizontal one-line correction data by performing dark image photography during the manufacturing process of image capture apparatuses and performing a projection operation on an image obtained by the dark image photography.

In performing dark shading correction using the correction data, readout is performed a plurality of times to secure dynamic range when long exposure is performed. When readout is performed a plurality of times, a circuit noise is generated every time readout is performed. Therefore, it is necessary to perform horizontal dark shading correction for every readout operation. Accordingly, with respect to image data that is finally obtained by an arithmetical operation using all of the read-out images, horizontal dark shading correction has to be performed in total a number of times corresponding to the number of times that readout is performed. Therefore, a shutter release time lag increases, so that a user may miss a photo opportunity. In addition, since quantization errors that occur during horizontal dark shading correction are accumulated, image quality may deteriorate in the case of a photography mode in which readout is performed a plurality of times.

FIGS. 10A and 10B illustrate horizontal dark shading correction that is performed as described above on dark image data. In the case of short exposure shown in FIG. 10A, correction is performed only once. Correction data in this case has a resolution of 1 LSB (least significant bit) value. Image data after dark noise correction (dark image) is data that has been adequately corrected with a precision of 1 LSB value or less.

In the case of long exposure shown in FIG. 10B, results of correction performed a plurality of times are added together. In this case, the following problem arises. Let n represent the number of times of correction. Then, image data can be considered to have been corrected using correction data having a resolution of the sum of n LSB values in total. An image signal obtained from the image sensor retains image information having a resolution of 1 LSB value even after the addition operation, although the image signal contains quantization errors and noise components.

However, if correction data used for the correction operation has a resolution of the sum of n LSB values (n=4 in the case of FIG. 10B), image data after dark noise correction becomes image data having only a precision of the sum of 4 LSB values. In this case, a discontinuous image results. For example, if dark shading correction in the horizontal direction is performed, an image having a vertically-striped pattern within an image frame results. Thus, the image quality of a captured image deteriorates.

SUMMARY OF THE INVENTION

The present invention has been made in consideration of the above situation, and has an aspect to provide an image capture apparatus, an image capture method, a computer program and a computer-readable recording medium that are capable of reducing image deterioration caused by accumulation of quantization errors even when correcting image data obtained by performing readout a plurality of times.

In one aspect of the present invention, an image capture apparatus includes a quantization precision selection device configured to select a first quantization precision in a case where an operation for reading out image data from an image sensor is performed a plurality of times for one exposure operation and to select a second quantization precision that is lower than the first quantization precision in a case where an operation for reading out the image data from the image sensor is performed once for one exposure operation, and an image data correction device configured to perform correction processing of the image data using correction data having one of the first and second quantization precisions selected by the quantization precision selection device.

In another aspect of the present invention, an image capture method includes a quantization precision selection step of selecting a first quantization precision in a case where an operation for reading out image data from an image sensor is performed a plurality of times for one exposure operation and selecting a second quantization precision that is lower than the first quantization precision in a case where an operation for reading out the image data from the image sensor is performed once for one exposure operation, and an image data correction step of performing correction processing of the image data using correction data having one of the first and second quantization precisions selected by the quantization precision selection step.

In a further aspect of the present invention, a computer program causes a computer to perform the above-described image capture method.

In a further aspect of the present invention, a computer-readable recording medium has the above-described computer program recorded thereon.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6 and 7 show a flow chart illustrating an example of the photography procedure of the image processing apparatus according to the embodiment.

FIG. 8 is a diagram illustrating correction of an original image using one-dimensional correction data in both the vertical and horizontal directions according to the embodiment.

FIGS. 9A to 9E are diagrams illustrating the sequence of a readout operation performed a plurality of times at the time of long exposure according to the embodiment.

FIGS. 10A and 10B are diagrams illustrating an example of conventional dark noise correction.

DETAILED DESCRIPTION OF THE EMBODIMENTS

Embodiments of the invention will be described in detail below with reference to the drawings. However, the dimensions, materials, shapes and relative positions of the constituent parts shown in the embodiments can be changed as convenient depending on various conditions and on the structure of the apparatus adapted to the invention, and the invention is not limited to the embodiments described herein.

Figure 1:
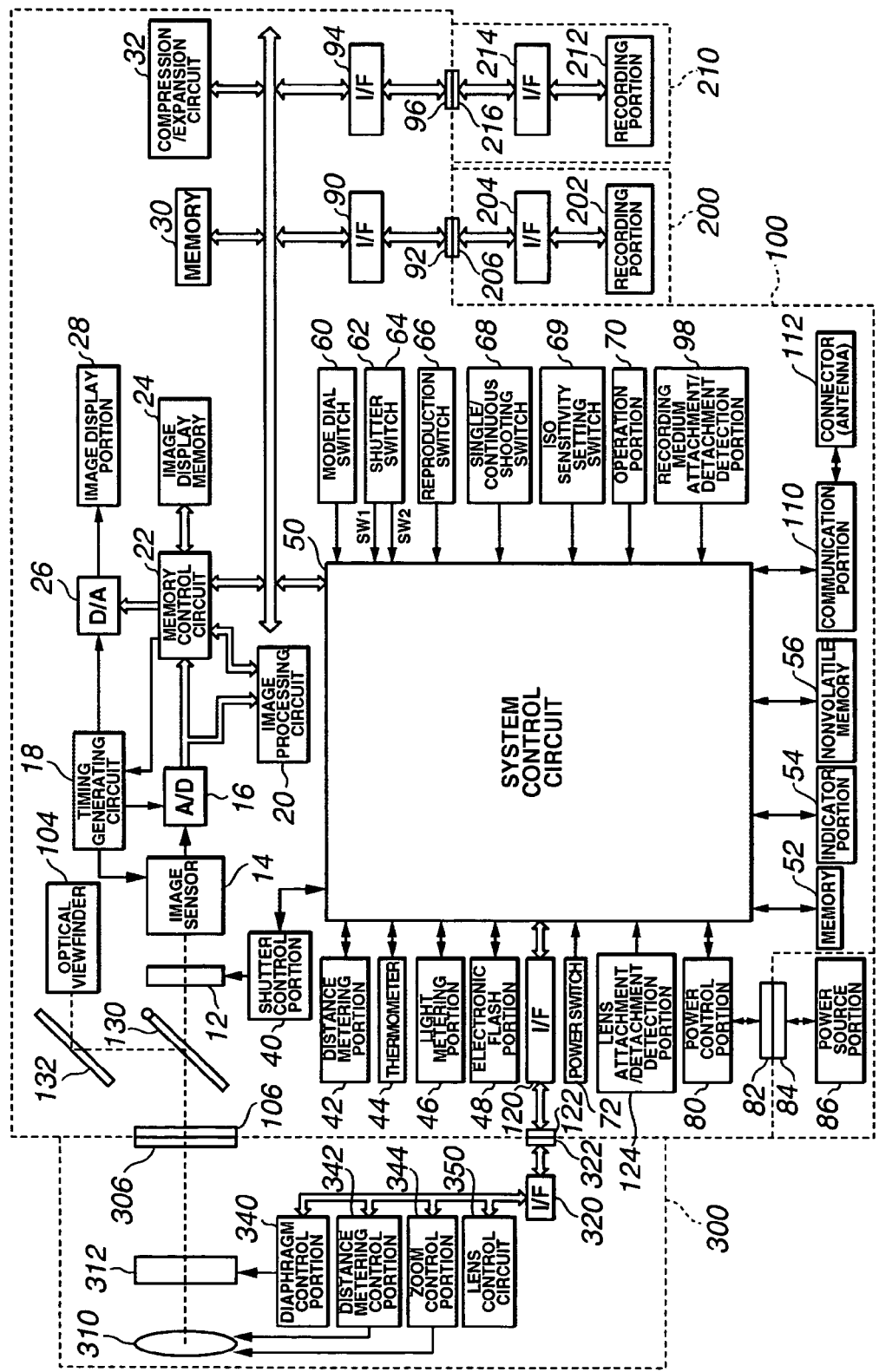
FIG. 1 is a block diagram showing an example of the construction of an electronic camera according to an embodiment of the invention.

FIG. 1 is a block diagram showing an example of the construction of an electronic camera, which serves as an image capture apparatus according to an embodiment of the invention.

Referring to FIG. 1, the electronic camera includes an image processing apparatus 100 and a lens unit 300. The image processing apparatus 100 includes a shutter 12 and an image sensor 14. The shutter 12 has a stop function of controlling the amount of exposure of the image sensor 14. The image sensor 14 converts an optical image into an electrical signal.

The lens unit 300 includes a photographing lens 310, a diaphragm 312 and a lens mount 306. The image processing apparatus 100 further includes a lens mount 106 and a mirror 130. A light beam incident on the photographing lens 310 is guided to the image sensor 14 via the diaphragm 312, the lens mounts 306 and 106, the mirror 130 and the shutter 12 in a single-lens reflex fashion and is focused as an optical image on the image sensor 14.

The image processing apparatus 100 further includes an analog-to-digital (A/D) converter 16, a timing generating circuit 18, a digital-to-analog (D/A) converter 26, a memory control circuit 22 and a system control circuit 50. The A/D converter 16 converts an analog signal output from the image sensor 14 into a digital signal. The timing generating circuit 18 supplies clock signals or control signals to the image sensor 14, the A/D converter 16 and the D/A converter 26 and is controlled by the memory control circuit 22 and the system control circuit 50.

The image processing apparatus 100 further includes an image processing circuit 20, an exposure (shutter) control portion 40 and a distance metering portion 42. The image processing circuit 20 performs predetermined pixel interpolation processing and color conversion processing on data from the A/D converter 16 or data from the memory control circuit 22. The image processing circuit 20 further performs a predetermined arithmetic operation using captured image data as needed. On the basis of a result of the arithmetic operation, the system control circuit 50 performs AF (auto focusing), AE (auto exposure) and EF (electronic flash) processing in the TTL (through the lens) method to control the shutter control portion 40 and the distance metering portion 42.

In addition, the image processing circuit 20 performs a predetermined arithmetic operation using captured image data and performs AWB (auto white balance) processing in the TTL method on the basis of a result of the arithmetic operation.

The image processing apparatus 100 further includes an image display memory 24, a memory 30 and a compression/expansion circuit 32. The memory control circuit 22 controls the A/D converter 16, the timing generating circuit 18, the image processing circuit 20, the image display memory 24, the D/A converter 26, the memory 30 and the compression/expansion circuit 32.

Data from the A/D converter 16 is written into the image display memory 24 or the memory 30 via the image processing circuit 20 and the memory control circuit 22 or via the memory control circuit 22.

The image processing apparatus 100 further includes an image display portion 28. The image display portion 28 is a thin film transistor liquid crystal display (TFT LCD). Image data for display written in the image display memory 24 is displayed on the image display portion 28 via the D/A converter 26. When captured image data is successively displayed on the image display portion 28, an electronic viewfinder function can be implemented. In addition, the image display portion 28 can be turned on and off according to an instruction from the system control circuit 50. When the image display portion 28 is turned off, the power consumption of the image processing apparatus 100 can be greatly reduced.

The memory 30 stores captured still images or moving images and has enough storage capacity to store a predetermined number of still images or a predetermined duration of moving images. Accordingly, even in the case of continuous photography or panoramic photography during which a plurality of still images are continuously captured, a large amount of images can be written into the memory 30 at a high speed. The memory 30 can also be used as a work area for the system control circuit 50.

The compression/expansion circuit 32 compresses and expands image data using adaptive discrete cosine transform (ADCT) or the like. The compression/expansion circuit 32 loads an image stored in the memory 30, compresses or expands the loaded image, and writes the processed data into the memory 30.

The image processing apparatus 100 further includes a light metering portion 46. The lens unit 300 further includes a diaphragm control portion 340 and a distance metering control portion 342. The diaphragm control portion 340 controls the diaphragm 312 based on metered light information from the light metering portion 46. The shutter control portion 40 controls the shutter 12 in cooperation with the diaphragm control portion 340. The distance metering portion 42 performs AF (auto focusing) processing. The distance metering portion 42 receives a light beam incident on the photographing lens 310 via the diaphragm 312, the lens mounts 306 and 106, the mirror 130 and a distance-metering sub mirror (not shown) in the single-lens reflex method to determine the focusing state of an optical image formed thereon.

The image processing apparatus 100 further includes a thermometer 44 and an electronic flash portion 48. The thermometer 44 detects the ambient temperature of an environment surrounding the electronic camera. If the thermometer 44 is incorporated in the image sensor 14, a dark current generated in the image sensor 14 can be more accurately predicted. The light metering portion 46 performs AE (auto exposure) processing. The light metering portion 46 receives a light beam incident on the photographing lens 310 via the diaphragm 312, the lens mounts 306 and 106, the mirror 130 and a light-metering sub mirror (not shown) in the single-lens reflex method to determine the exposure state of an optical image formed thereon. The light metering portion 46 also has an EF (electronic flash) processing function associated with the electronic flash portion 48. The electronic flash portion 48 has a function of projecting AF auxiliary light and a function of controlling the amount of flash.

In addition, as described above, the system control circuit 50 can perform exposure control and AF (auto focusing) control using the video TTL method for the exposure (shutter) control portion 40, the diaphragm control portion 340, and the distance metering control portion 342 on the basis of a result of an arithmetic operation performed by the image processing circuit 20 using image data obtained by the image sensor 14.

In addition, AF (auto focusing) control may also be performed using a result of metering performed by the distance metering portion 42 and a result of an arithmetic operation performed by the image processing circuit 20 using image data obtained by the image sensor 14. Exposure control may also be performed using a result of metering performed by the light metering portion 46 and a result of an arithmetic operation performed by the image processing circuit 20 using image data obtained by the image sensor 14.

The system control circuit 50 controls the image processing apparatus 100 and contains a CPU (central processing unit). The image processing apparatus 100 further includes a memory 52, an indicator portion 54 and an optical viewfinder 104. The memory 54 stores therein constants, variables, programs, etc., used for operation of the system control circuit 50. The indicator portion 54 has a liquid crystal display device, a speaker, etc., for indicating operating states, messages, etc., using characters, images, sounds, etc., in accordance with execution of programs by the system control circuit 50. The indicator portion 54 is disposed in one or a plurality of places near an operation portion 70 of the image processing apparatus 100 which are easy to view, and is constituted by a combination of an LCD (liquid crystal display), an LED (light emitting diode), a sound generator, etc. Some functions of the indicator portion 54 are provided inside the optical viewfinder 104.

Contents to be indicated on the LCD or the like among the indication contents of the indicator portion 54 include single/continuous shooting indication, self-timer indication, compression ratio indication, number of recording pixels indication, number of recorded frames indication, number of remaining recordable frames indication, shutter speed indication, aperture value indication, exposure compensation indication, flash indication, red-eye reduction indication, macro photography indication, buzzer setting indication, remaining amount of clock battery indication, remaining amount of battery indication, error indication, plural digits indication, attachment/detachment indication for recording media 200 and 210, attachment/detachment indication for the lens unit 300, operation indication for communication interfaces, date and time indication, indication of state of connection to an external computer, etc.

Contents to be indicated inside the optical viewfinder 104 among the indication contents of the indicator portion 54 include in-focus indication, photography preparation completion indication, camera-shake warning indication, flash charging indication, flash charge completion indication, shutter speed indication, aperture value indication, exposure compensation indication, recording medium writing operation indication, etc.

Contents to be indicated by the LED or the like among the indication contents of the indicator portion 54 include in-focus indication, photography preparation completion indication, camera-shake warning indication, flash charging indication, flash charge completion indication, recording medium writing operation indication, macro photography indication, secondary battery charging indication, etc.

Contents to be indicated by the lamp or the like among the indication contents of the indicator portion 54 include a self-timer notification lamp, etc. The self-timer notification lamp may also be used as AF auxiliary light.

The image processing apparatus 100 further includes an electrically erasable/recordable nonvolatile memory 56. The nonvolatile memory 56 stores therein programs, etc., and may be an EEPROM (electrically erasable programmable read-only memory). The nonvolatile memory 56 further stores therein various parameters, setting values for ISO sensitivity, etc., setting modes, and one-dimensional correction data used for horizontal dark shading correction.

In the case of an image sensor in which all horizontal lines share a readout circuit and noises generated when signals from the horizontal lines are transferred to the readout circuit are made small by, for example, improving a circuit layout, a vertical fixed-pattern noise is small and hence need not be corrected. In an image capture apparatus using such an image sensor, a fixed-pattern noise can be removed by correcting an original image using horizontal one-dimensional correction data. The one-dimensional correction data is created and written into the nonvolatile memory 56 during adjustment in the manufacturing process of electronic cameras. For example, the one-dimensional correction data can be data for one horizontal line formed by performing a projection operation on an image obtained by dark image photography.

In performing a projection operation in the manufacturing process, correction data is calculated with a precision of up to the decimal fraction part. When a projection operation is performed using outputs of 1024 pixels arranged in the vertical direction per one pixel row, for example, with an ordinary precision of 1 LSB value, all of the outputs of 1024 pixels are added together, and the obtained sum is divided by 1024 to obtain correction data with a precision of 1 LSB value. The correction data is calculated for every pixel row, so that horizontal one-line correction data is obtained.

In the present embodiment, information about decimal places is also stored as correction data in the storage means (nonvolatile memory 56). More specifically, all of outputs of 1024 pixels are added together, and the obtained sum is divided by 1024 to obtain correction data up to, for example, the low-order four bits after the decimal point (four places of decimals). The correction data is calculated for every pixel row, so that horizontal one-line correction data is obtained. Thus, correction data is calculated with a precision of $\frac{1}{16}$ LSB value and is then stored in the nonvolatile memory 56.

The image forming apparatus 100 further includes operation portions 60, 62, 64, 66, 68, 69 and 70 configured to allow the user to input various instructions to the system control circuit 50. Each operation portion is a switch, a dial, a touch panel, a pointing device using visual-line detection, a speech recognition device, or a combination of some of these elements.

The mode dial switch 60 is operable to selectively set various functional photography modes including auto photography mode, program photography mode, shutter-priority photography mode, aperture-priority photography mode, manual photography mode, focal depth-priority mode, portrait photography mode, landscape photography mode, close-up photography mode, sport photography mode, night view photography mode, panoramic photography mode, etc.

The first shutter switch 62 (SW1) is turned on in response to the half depression of a shutter button (not shown) to issue instructions to start operations of AF (auto focusing), AE (auto exposure), AWB (auto white balance), EF (electronic flash), etc.

The second shutter switch 64 (SW2) is turned on in response to the complete depression of the shutter button (not shown). The shutter switch 64 (SW2) issues instructions to start a series of operations including an exposure process for converting a signal read out from the image sensor 14 into image data via the A/D converter 16 and writing the image data into the memory 30 via the memory control circuit 22, a development process for performing arithmetic operations via the image processing circuit 20 and the memory control circuit 22, and a recording process for reading out image data from the memory 30, compressing the image data via the compression/expansion circuit 32 and writing the compressed image data into the recording medium 200 or 210.

The reproduction switch 66 issues instructions to start a reproduction operation for reading out a captured image from the memory 30 or the recording medium 200 or 210 and displaying the read-out image on the image display portion 28. The single/continuous shooting switch 68 is operable to set a single shooting mode in which only one frame image is captured when the second shutter switch 64 (SW2) is pressed and then a standby state follows, and a continuous shooting mode in which several frame images are serially captured while the second shutter switch 64 (SW2) is kept pressed. The ISO sensitivity setting switch 69 is operable to set ISO sensitivity by changing the gain setting of the image sensor 14 or the image processing circuit 20.

The operation portion 70 is composed of various buttons, touch panels, etc., including a menu button, a set button, a macro button, a multi screen reproduction page feed button, a flash setting button, a single/continuous/self-timer shooting switching button, a menu move +(plus) button, a menu move −(minus) button, a reproduced image move +(plus) button, a reproduced image move −(minus) button, a photographed image quality selection button, an exposure compensation button, a date/time setting button, a selection/switching button for selecting and switching various functions when performing photography and reproduction in the panoramic mode or the like, a determination/execution button for determining and executing various functions when performing photography and reproduction in the panoramic mode or the like, an image display ON/OFF switch for setting ON/OFF of the image display portion 28, a quick review ON/OFF switch for setting a quick review function for automatically reproducing captured image data immediately before completion of photography, a compression mode switch for selecting the compression ratio of JPEG compression or selecting a CCDRAW mode for directly digitizing an image signal from the image sensor and recording the digitized image signal on a recording medium, a reproduction switch capable of setting various function modes, such as a reproduction mode, a multiscreen reproduction/erase mode and a PC connection mode, an AF mode setting switch capable of setting a one-shot AF mode in which an auto focusing action is started when the first shutter switch 62 (SW1) is pressed and, once an in-focus state is attained, the in-focus state is held, and a servo AF mode in which an auto focusing action is continued while the shutter switch 62 (SW1) is kept pressed.

The functions of the above-described plus buttons and minus buttons may be replaced with rotary dial switches to allow the user to more easily select numerical values or functions.

The image processing apparatus 100 further includes a power switch 72. The power switch 72 is operable to selectively set a power-on mode and a power-off mode of the image processing apparatus 100. In addition, the power switch 72 is also operable to selectively set power-on and power-off settings of various attachment devices, such as the lens unit 300, an external flash unit (not shown), the recording medium 200 or 210, etc.

The image processing apparatus 100 further includes a power control portion 80. The power control portion 80 is composed of a battery voltage detection circuit, a DC-DC converter, a switch circuit for switching blocks to be energized, etc. The power control portion 80 detects the attachment of a battery, the type of a battery and the remaining amount of a battery. In accordance with a result of the detection and an instruction from the system control circuit 50, the power control portion 80 controls the DC-DC converter to supply a necessary voltage to individual portions, including the recording medium 200 or 210, for a necessary period.

The image processing apparatus 100 further includes a connector 82. The connector 82 is connectable to a connector 84 of a power source portion 86. The power source portion 86 is a primary battery, such as an alkaline battery or lithium battery, a secondary battery, such as a NiCd battery, NiMH battery or Li battery, or an AC adapter.

The image processing apparatus 100 further includes interfaces 90 and 94, connectors 92 and 96, and a recording medium attachment/detachment detection portion 98. The interfaces 90 and 94 are provided for communication with the recording media 200 and 210, such as memory cards or hard disks. The connectors 92 and 96 are connectable to connectors 206 and 216 of the recording media 200 and 210, respectively. The recording medium attachment/detachment detection portion 98 detects whether the recording media 200 and 210 are attached to the connectors 92 and 96, respectively.

In the present embodiment, two systems of interfaces and connectors for attaching recording media are provided in the image processing apparatus 100. However, one or three or more systems of interfaces and connectors for attaching recording media may be provided. In addition, interfaces and connectors compliant with another standard, for example, the PCMCIA card standard or the CF (Compactflash®) card standard, may also be employed.

Furthermore, in cases where the interfaces 90 and 94 and the connectors 92 and 96 are compliant with, for example, the PCMCIA card standard or the CF (Compactflash®) card standard, various communication cards, such as a LAN card, a modem card, a USB card, an IEEE 1394 card, a P1284 card, a SCSI card or a PHS communication card, can be connected. Accordingly, image data and management information attached thereto can be transferred to and from another computer or a peripheral device such as a printer.

The image processing apparatus 100 further includes a mirror 132 adjacent to the optical viewfinder 104. A light beam incident on the photographing lens 310 is guided to the optical viewfinder 104 via the diaphragm 312, the lens mounts 306 and 106, the mirrors 130 and 132 in the single-lens reflex method and is focused on the optical viewfinder 104 as an optical image to be viewable by the user. Accordingly, the user can take a photograph while viewing only an image on the optical viewfinder 104 without using the electronic viewfinder function provided by the image display portion 28. In addition, some functions of the indicator portion 54, for example, in-focus indication, camera-shake warning indication, flash charging indication, shutter speed indication, aperture value indication and exposure compensation indication, are provided inside the optical viewfinder 104.

The image processing apparatus 100 further includes a communication portion 110 and a connector or antenna 112. The communication portion 110 has various communication functions, such as RS23C, USB, IEEE 1394, P1284, SCSI, modem, LAN and wireless communication. The connector or antenna 112 is configured to connect the image processing apparatus 100 to another apparatus via the communication portion 110 or to perform wireless communication.

The image processing apparatus 100 further includes an interface 120, a connector 122 and a lens attachment/detachment detection portion 124. The interface 120 is configured to connect the image processing apparatus 100 to the lens unit 300 inside the lens mount 106. The connector 122 electrically connects the image processing apparatus 100 to the lens unit 300. The lens attachment/detachment detection portion 124 detects whether the lens unit 300 is attached to the lens mount 106 and/or the connector 122.

The connector 122 allows a control signal, a status signal, a data signal, etc., to be transferred between the image processing apparatus 100 and the lens unit 300, and has the function of supplying electric currents having various voltages. The connector 122 may be configured to perform optical communication, voice communication or the like in addition to electrical communication.

The mirrors 130 and 132 guide a light beam incident on the photographing lens 310 to the optical viewfinder 104 in the single-lens reflex method. The mirror 132 can be a quick-return mirror or a half-reflection mirror.

The recording medium 200 can be a memory card, a hard disk or the like. The recording medium 200 includes a recording portion 202, an interface 204 and a connector 206. The recording portion 202 is, for example, a semiconductor memory or a magnetic disk. The interface 204 is provided for communicating with the image processing apparatus 100. The connector 206 is connectable to the connector 92 of the image processing apparatus 100.

Similar to the recording medium 200, the recording medium 210 can be a memory card, a hard disk or the like. The recording medium 210 includes a recording portion 212, an interface 214 and a connector 216. The recording portion 212 is, for example, a semiconductor memory or a magnetic disk. The interface 214 is provided for communicating with the image processing apparatus 100. The connector 216 is connectable to the connector 96 of the image processing apparatus 100.

The lens unit 300 is an interchangeable lens unit. The lens mount 306 mechanically couples the lens unit 300 with the image processing apparatus 100. The lens mount 306 contains various functions of electrically connecting the lens unit 300 to the image processing apparatus 100.

The lens unit 300 further includes an interface 320 and a connector 322. The interface 320 is configured to connect the lens unit 300 to the image processing apparatus 100 inside the lens mount 306. The connector 322 electrically connects the lens unit 300 to the image processing apparatus 100.

The connector 322 allows a control signal, a status signal, a data signal, etc., to be transferred between the image processing apparatus 100 and the lens unit 300, and has the function of receiving various electric currents or supplying electric currents. The connector 322 may be configured to perform optical communication, voice communication or the like in addition to electrical communication.

The diaphragm control portion 340 controls the diaphragm 312 in cooperation with the shutter control portion 40, which controls the shutter 12, on the basis of metered light information from the light metering portion 46. The distance metering control portion 342 controls focusing of the photographing lens 310. The lens unit 300 further includes a zoom control portion 344. The zoom control portion 344 controls zooming of the photographing lens 310.

The lens unit 300 further includes a lens control circuit 350. The lens control circuit 350 controls the lens unit 300. The lens control circuit 350 also has the function of a memory storing constants, variables, programs, etc., for operations, and the function of a nonvolatile memory storing identification information such as a number unique to the lens unit 300, management information, function information such as a fully-open aperture value, minimum aperture value and focal length, present or past setting values, etc.

Figure 2:
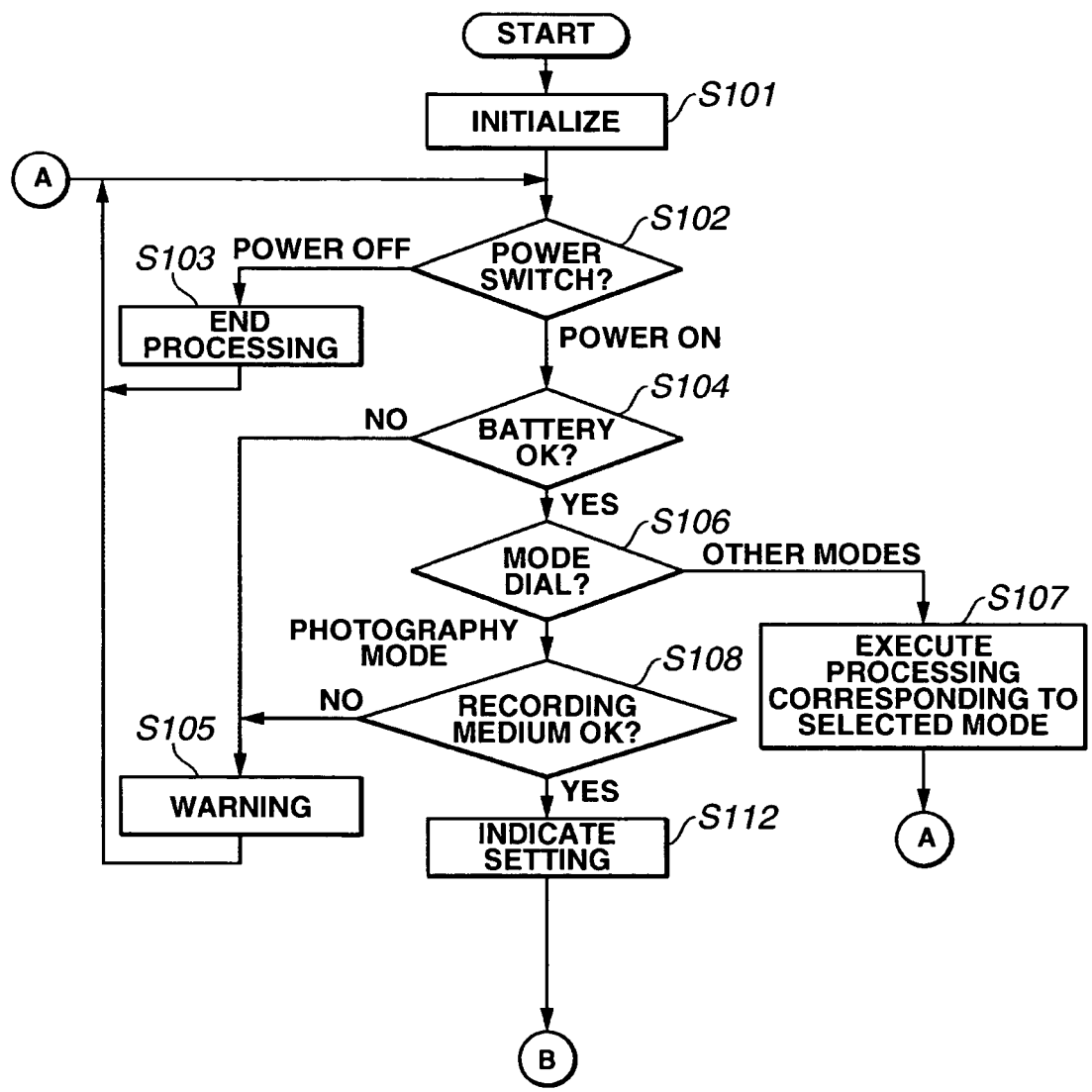
FIGS. 2 to 4 show a flowchart illustrating the photographing operation procedure of an image processing apparatus included in the electronic camera according to the embodiment.
Figure 3:
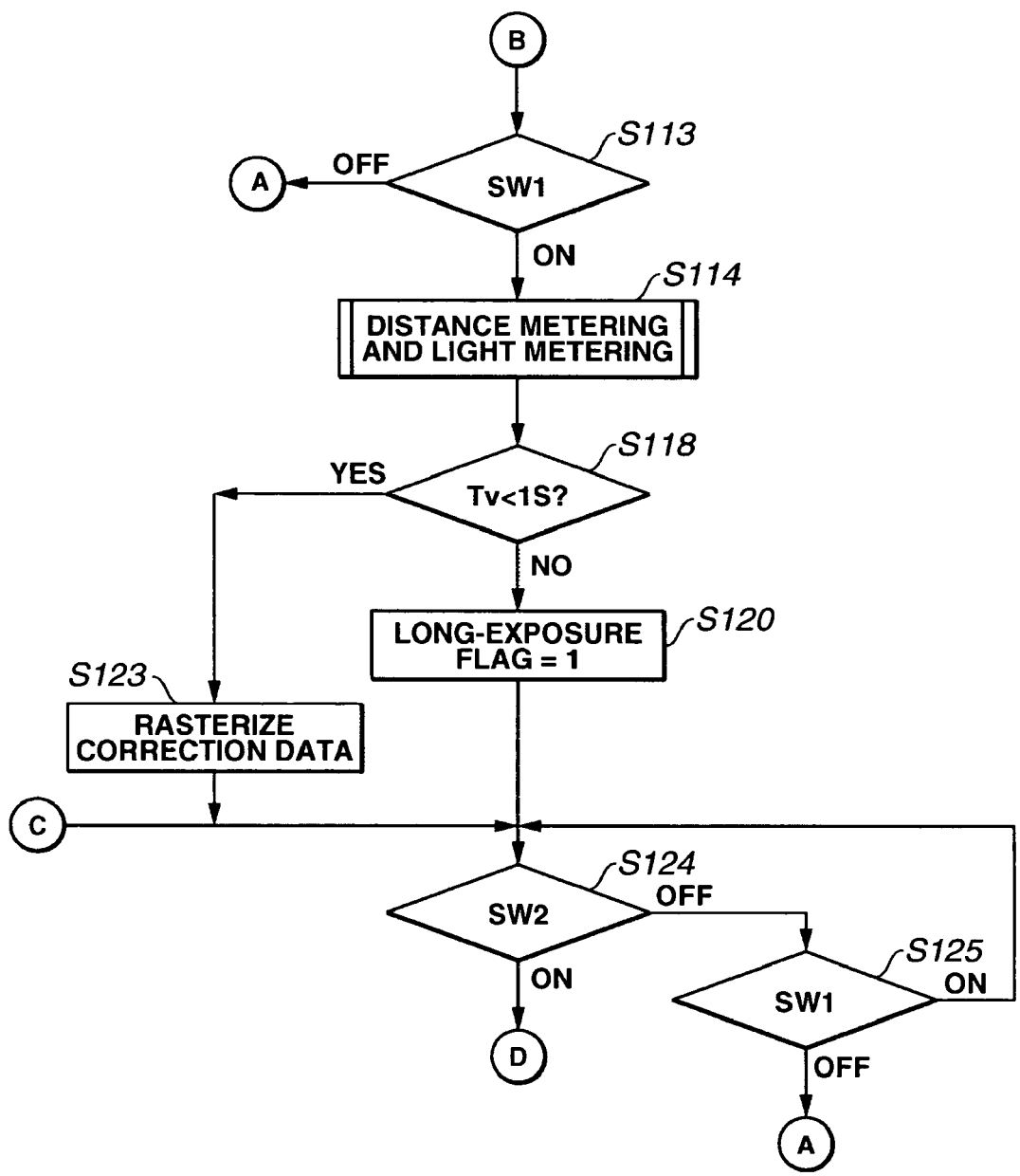
Figure 4:
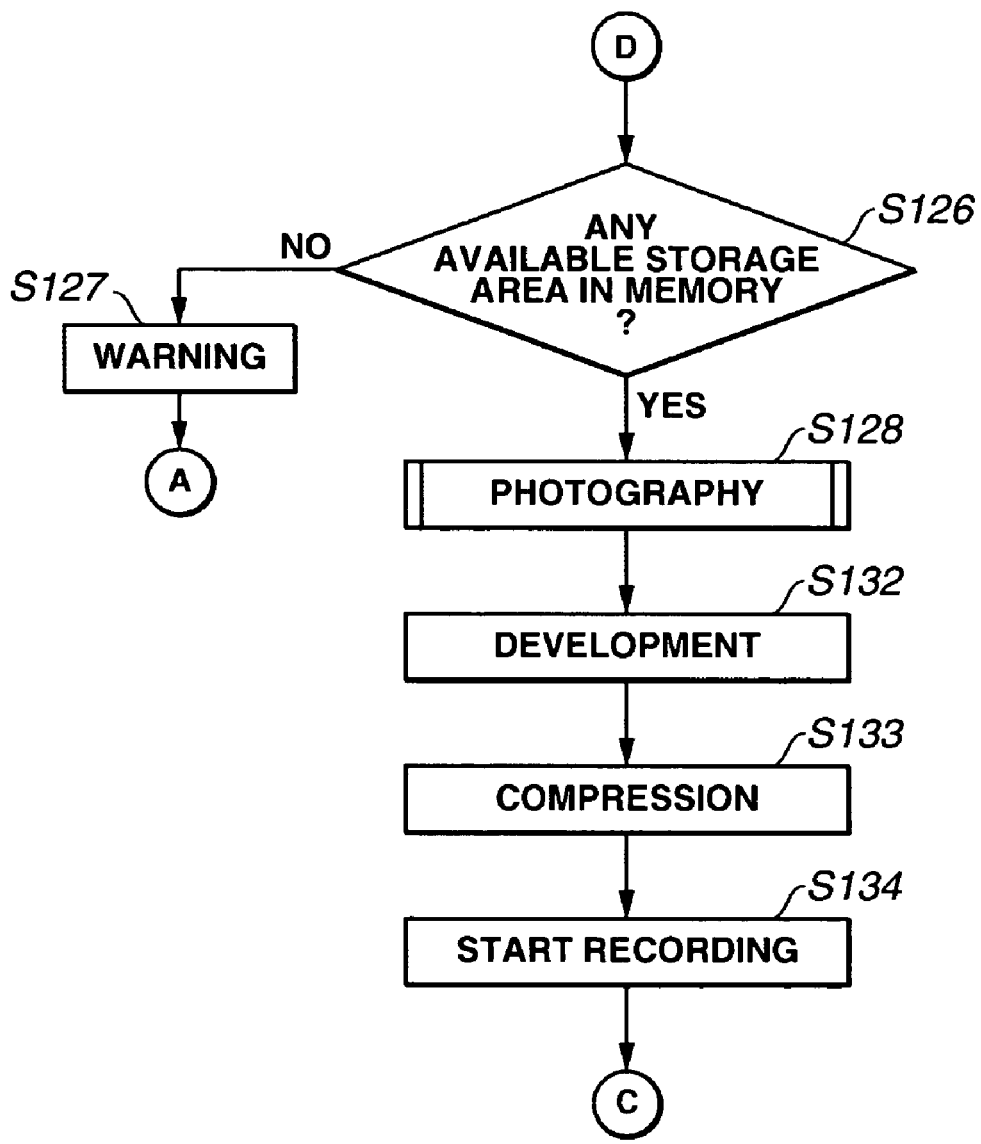

Operation of the electronic camera configured as described above is described below. FIGS. 2 to 4 are a flow chart illustrating the photographing operation procedure of the image processing apparatus 100 according to the present embodiment. A program for implementing this operation procedure is stored in a storage medium, such as the nonvolatile memory 52. During operation, the program is loaded in the memory 52 and is then executed by a CPU (not shown) incorporated in the system control circuit 50.

Referring to FIG. 2, when the photographing operation procedure is started, the system control circuit 50 performs initialization at step S101. In the present embodiment, when the power supply is turned on in response to the replacement of batteries or the like, the system control circuit 50 initializes flags, control variables, etc., and performs necessary predetermined settings for the individual portions of the image processing apparatus 100.

At step S102, the system control circuit 50 checks the set position of the power switch 72 to determine whether the power switch 72 is set to power OFF or to power ON. If the power switch 72 is set to power OFF, the system control circuit 50 performs predetermined end processing, for example, to end displaying of each indicator portion, record necessary parameters including flags and control variables, set values and set modes in the nonvolatile memory 56, and cause the power control portion 80 to shut down unnecessary supplying of power to the individual portions of the image processing apparatus 100 including the image display portion 28 (step S103). After that, the system control circuit 50 returns to step S102.

If it is determined at step S102 that the power switch 72 is set to power ON, the system control circuit 50 causes the power control portion 80 to check whether the remaining amount of power or the operating status of the power source portion 86, such as a battery, is suitable for the operation of the image processing apparatus 100 (step S104). If there is a problem, the system control circuit 50 causes the indicator portion 54 to give a predetermined warning by displaying an image or outputting sound (step S105). After that, the system control circuit 50 returns to step S102.

If it is determined at step S104 that there is no problem with the power source portion 86, the system control circuit 50 checks the set position of the mode dial switch 60 to determine whether the mode dial switch 60 is set to a photography mode (step S106).

If it is determined at step S106 that the mode dial switch 60 is set to a mode other than the photography mode, the system control circuit 50 executes processing corresponding to the selected mode (step S107). After that, the system control circuit 50 returns to step S102.

If it is determined at step S106 that the mode dial switch 60 is set to the photography mode, the system control circuit 50 checks whether the recording medium 200 or 210 is already attached to the image processing apparatus 100 and whether the acquisition of management information of image data recorded on the recording medium 200 or 210 and the operating status of the recording medium 200 or 210 are suitable for the operation of the image processing apparatus 100, particularly, for the recording and reproduction of image data on and from the recording medium 200 or 210 (step S108). If it is determined at step S108 that there is a problem with the recording medium 200 or 210, the system control circuit 50 causes the indicator portion 54 to give a predetermined warning by displaying an image or outputting sound (step S105). After that, the system control circuit 50 returns to step S102.

If it is determined at step S108 that there is no problem with the recording medium 200 or 210, the system control circuit 50 proceeds to step S112. At step S112, the system control circuit 50 causes the indicator portion 54 to indicate the various setting states of the image processing apparatus 100 using an image or sound. If an image display switch (not shown) provided on the image display portion 28 is in an ON state, the image display portion 28 may also display the various setting states of the image processing apparatus 100 using an image or sound.

Then, the system control circuit 50 proceeds to step S113 (shown in FIG. 3). At step S113, the system control circuit 50 checks whether the first shutter switch 62 (SW1) is pressed. If the first shutter switch 62 (SW1) is not pressed, the system control circuit 50 returns to step S102. If the first shutter switch 62 (SW1) is pressed, the system control circuit 50 performs distance metering and light metering processing to focus the photographing lens 310 on an object and determine an aperture value and a shutter speed (step S114). In the light metering processing, the electronic flash portion 48 is set if necessary. The details of the distance metering and light metering processing (step S114) are described later.

At step S118, the system control circuit 50 checks whether the shutter speed is less than 1 sec. If the shutter speed is less than 1 sec, the system control circuit 50 proceeds to step S123. If the shutter speed is 1 sec or more, the system control circuit 50 proceeds to step S120 without performing rasterizing of horizontal dark shading correction data, which is described below. At step S120, the system control circuit 50 sets a long-exposure flag and then proceeds to step S124.

Figure 5:
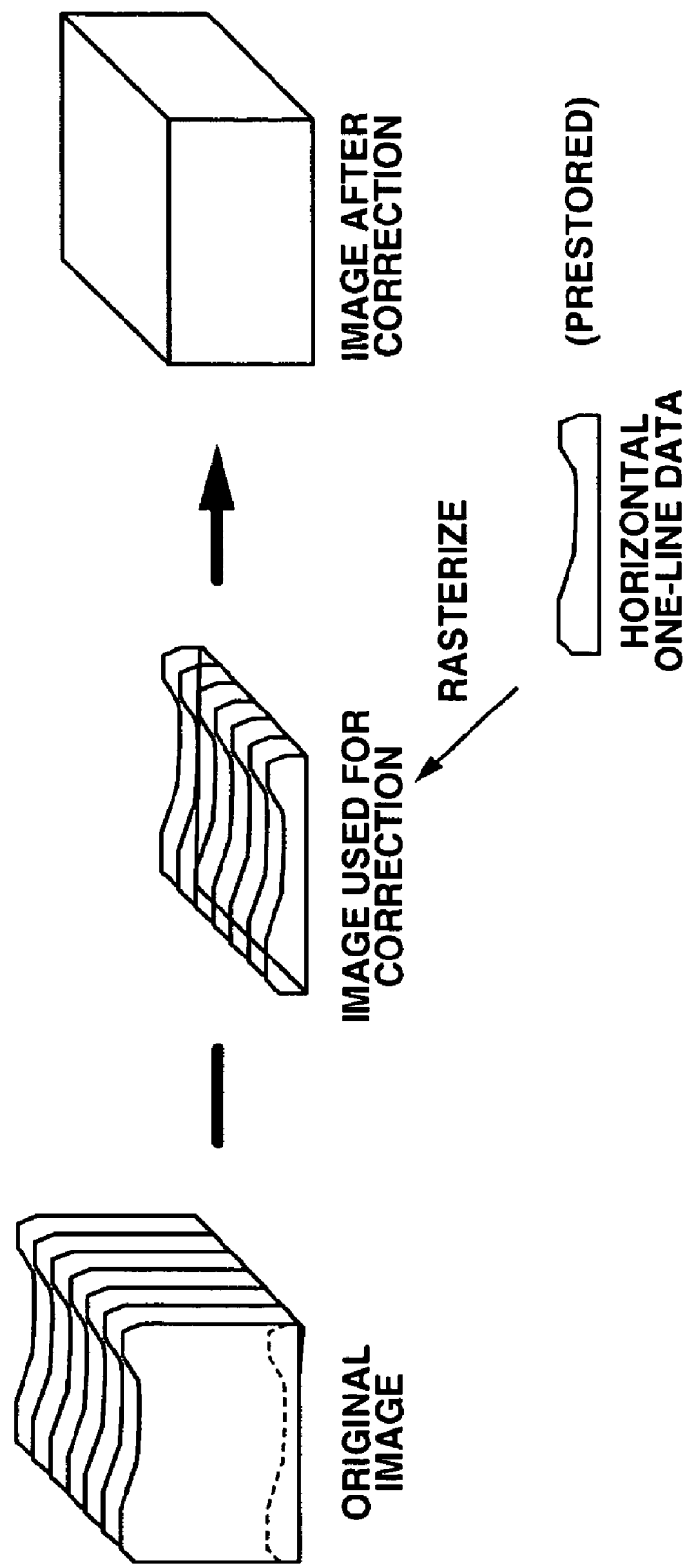
FIG. 5 is a diagram illustrating correction of an original image using horizontal dark shading correction data.

At step S123, the system control circuit 50 reads out one-dimensional correction data used for horizontal dark shading correction from the nonvolatile memory 56, and repeatedly rasterizes the one-dimensional correction data onto a predetermined area of the memory 30 in the vertical direction by the number of lines equal to that of an actual image. FIG. 5 is a diagram illustrating an example of correcting an original image using horizontal dark shading correction data. In the present step S123, since short-exposure photography is set, only information about an integral part of the correction data is used. After completion of rasterising of the correction data, the system control circuit 50 proceeds to step S124.

At step S124, the system control circuit 50 checks whether the second shutter switch 64 (SW2) is pressed. If the second shutter switch 64 (SW2) is not pressed, the system control circuit 50 checks whether the first shutter switch 62 (SW1) is released (step S125). The system control circuit 50 repeats the processes in steps S124 and S125 until the first shutter switch 62 (SW1) is released or the second shutter switch 64 (SW2) is pressed. If it is determined at step S125 that the first shutter switch 62 (SW1) is released, the system control circuit 50 proceeds to step S102.

If it is determined at step S124 that the second shutter switch 64 (SW2) is pressed, the system control circuit 50 proceeds to step S126 (shown in FIG. 4). At step S126, the system control circuit 50 checks whether any storage area available for storing captured image data is present in an image storage buffer area of the memory 30. If there is no storage area available for storing new captured image data in the image storage buffer area of the memory 30, the system control circuit 50 causes the indicator portion 54 to give a predetermined warning by displaying an image or outputting sound (step S127). After that, the system control circuit 50 returns to step S102.

For example, in cases where, immediately after a continuous shooting operation for a maximum number of frames storable in the image storage buffer area of the memory 30 has been performed, the first frame image to be read out from the memory 30 and written into the recording medium 200 or 210 is not yet recorded on the recording medium 200 or 210 and any empty area for even one frame image cannot be secured in the image storage buffer area of the memory 30, the system control circuit 50 determines that there is no storage area available for storing new captured image data in the image storage buffer area of the memory 30.

When captured image data is to be stored in the image storage buffer area of the memory 30 after being compressed, the amount of compressed image data varies depending on the setting of a compression mode. Taking this into consideration, at step S126, the system control circuit 50 checks whether any storage area available for storing captured image data is present in the image storage buffer area of the memory 30.

In addition, if the long-exposure flag is set at step S120, the system control circuit 50 obtains the number of times of readout calculated from the set shutter speed and also checks whether any storage area available for storing image data corresponding to such a plurality of times of readout is present in the image storage buffer area of the memory 30.

If it is determined at step S126 that a storage area available for storing captured image data is present in the image storage buffer area of the memory 30, the system control circuit 50 proceeds to step S128. At step S128, the system control circuit 50 performs a photography process to read out an image signal captured and stored for a predetermined period from the image sensor 14 and to write the captured image data into a predetermined area of the memory 30 via the A/D converter 16, the image processing circuit 20 and the memory control circuit 22 or via the A/D converter 16 and the memory control circuit 22.

The details of step S128 shown in FIG. 4 are described next with reference to FIGS. 6 and 7. In the photography process procedure, various signals are transferred between the system control circuit 50 and the diaphragm control portion 340 or the distance metering control portion 342 via the interface 120, the connectors 122 and 322, the interface 320 and the lens control circuit 350.

Figure 6:
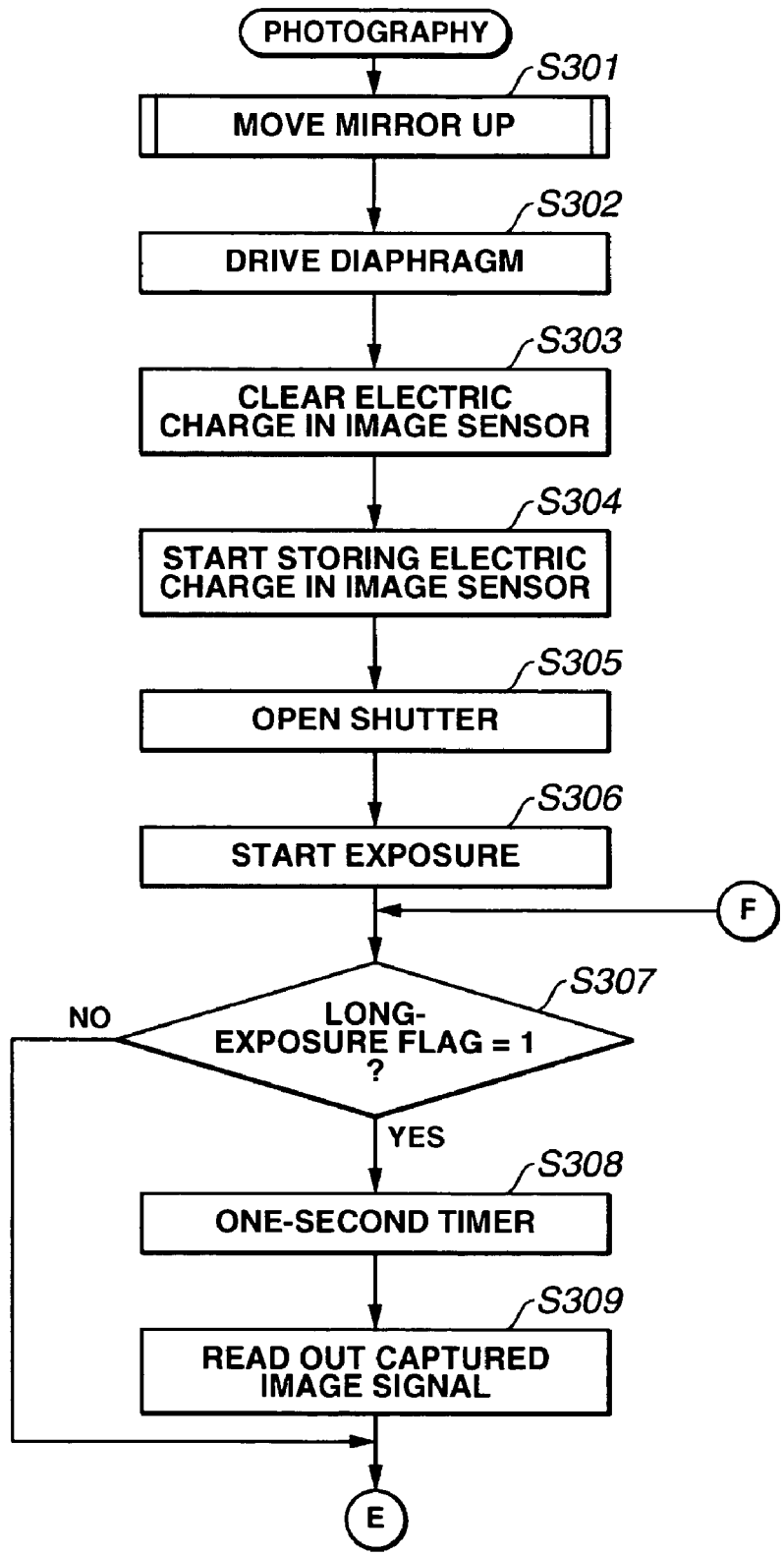

The system control circuit 50 causes a mirror driving portion (not shown) to move the mirror 130 to a mirror-up position (step S301 of FIG. 6). Then, the system control circuit 50 causes the diaphragm control portion 340 to drive the diaphragm 312 up to a predetermined aperture value in accordance with metered light data stored in an internal memory of the system control circuit 50 or in the memory 52 (step S302).

Subsequently, after clearing electric charge in the image sensor 14 (step S303), the system control circuit 50 starts electric charge storage in the image sensor 14 (step S304), causes the shutter control portion 40 to open the shutter 12 (step S305), and starts exposing the image sensor 14 (step S306).

After starting exposure, the system control circuit 50 checks whether the long-exposure flag is set (step S307). If the long-exposure flag is not set, the system control circuit 50 waits for completion of exposure (step S310 of FIG. 7).

If the long-exposure flag is set at step S307, the system control circuit 50 sets a timer that operates, for example, at intervals of 1 sec after starting exposing the image sensor 14 (step S308). Then, the system control circuit 50 sends a readout instruction to the image sensor 14 at intervals of 1 sec and reads out a captured image signal stored during every readout period from the image sensor 14 (step S309).

The image sensor 14 continues storing electric charge and outputs an image signal corresponding to electric charge stored during every readout period. The system control circuit 50 writes captured image data into a predetermined area of the memory 30 via the A/D converter 16, the image processing circuit 20 and the memory control circuit 22 or via the A/D converter 16 and the memory control circuit 22. This operation is repeated until a predetermined charge storage time has elapsed at step S310.

More specifically, if exposure for 2 sec is performed, readout is performed two times to obtain image data for two frames. The obtained image data for two frames are added together to form final image data. If exposure for 8 sec is performed, readout is performed eight times to obtain image data for eight frames. The obtained image data for eight frames are added together to form final image data.

FIGS. 9A to 9E illustrate the manner of the above-described addition. FIG. 9A shows the opening and closing of the shutter 12. As shown in FIG. 9B, a readout signal is output at intervals of 1 sec. Accordingly, as shown in FIG. 9C, the image sensor 14 starts storing electric charge at the same time that the shutter 12 is opened. After that, as shown in FIG. 9D, a readout instruction is given to the image sensor 14 at intervals of 1 sec. In this regard, however, an instruction for ending charge storage is not given, and readout continues while storing electric charge. Then, as shown in FIG. 9E, image data read out at intervals of 1 sec are sequentially written into the memory 30.

Here, for sake of simplicity, read-out image data are rasterized into the memory 30 in sequence. As the shutter 12 has been closed after readout has been performed three times during the open state of the shutter 12, readout is newly performed. Thus, readout is performed four times in total, and image data for four frames are stored in the memory 30. After that, the image data for four frames are integrated or accumulated to obtain image data for one frame. In the example shown in FIGS. 9A to 9E, for sake of simplicity, the image data for one frame obtained by integration is written into a memory area that is different from memory areas in which the image data for four frames are stored.

After the above-described photography sequence has been completed, correction data is calculated, and the calculated correction data is rasterized into the memory 30. In the last instance, the calculated correction data is subtracted from the image data obtained by integration, so that corrected image data is finally obtained.

Here, in the above-described example, for sake of simplicity, image data are stored and processed using memory areas in sequence. However, in cases where all of images read out a plurality of times at the time of long exposure are recorded to one memory, an enormous amount of capacity of the memory is used. Therefore, the consumed amount of capacity of the memory may be generally optimized, for example, by using a method in which image data for two frames are added together and the added image data is recorded to a memory area where the original image data for one frame has been recorded.

Referring back to FIG. 7, the system control circuit 50 waits for completion of exposure of the image sensor 14 based on metered light data (step S310). After completion of exposure, the system control circuit 50 causes the shutter control portion 40 to close the shutter 12 (step S311), thus ending exposure of the image sensor 14.

The system control circuit 50 causes the diaphragm control portion 340 to drive the diaphragm 312 up to a fully-open aperture value (step S312), and causes the mirror driving portion (not shown) to move the mirror 130 down (step S313).

Then, the system control circuit 50 checks whether the set charge storage time has elapsed (step S314). If the set charge storage time has elapsed, the system control circuit 50 ends charge storage of the image sensor 14 (step S315).

After that, the system control circuit 50 reads out an electric charge signal from the image sensor 14, and writes captured image data into a predetermined area of the memory 30 via the A/D converter 16, the image processing circuit 20 and the memory control circuit 22 or via the A/D converter 16 and the memory control circuit 22 (step S316).

Even where the long-exposure flag has been set, a readout process is performed once again at step S316. Accordingly, even if the storage time is not an integral multiple of a repetitive readout cycle, a remainder component can be adjusted by the readout process performed at step S316. For example, if the shutter speed is set to 3.2 sec, readout is repeated three times at intervals of 1 sec and, then, exposure for 0.2 sec is finally performed, so that image data for four frames are obtained. The image data for four frames are added together to obtain a final image.

After the captured image signal has been read out at step S316, the system control circuit 50 checks again whether the long-exposure flag is set (step S317). If the long-exposure flag is not set, i.e., if short-exposure photography is set, the system control circuit 50 immediately ends the photographing operation. If the long-exposure flag is set, the system control circuit 50 calculates correction data for long-exposure photography using the number of times that readout has been performed in the actual photographing operation (step S318).

Calculation of correction data at step S318 is now described in detail below. Supposing the shutter speed is set to 2 sec, a value obtained by subtracting a dark offset amount from correction data created during adjustment in the manufacturing process is multiplied by 2. To the value obtained by this multiplication, the dark offset amount is added. An integral part of the value obtained by this addition is set as new correction data.

In the present embodiment, correction data contains information indicating parts after the decimal point (here, a $\frac{1}{16}$ LSB value, for example). That is, a quantization precision is higher than when readout is performed once for one exposure operation as in short-exposure photography. Therefore, even if the correction data is multiplied by 2, the correction data has a resolution of 1 LSB value not a resolution of the sum of 2 LSB values.

Furthermore, supposing the shutter speed is set to 8 sec, a value obtained by subtracting a dark offset amount from correction data created during adjustment in the manufacturing process is multiplied by 8. To the value obtained by this multiplication, the dark offset amount is added. An integral part of the value obtained by this addition is set as new correction data. In this case, the correction data also contains information indicating parts after the decimal point. Therefore, even if the correction data is multiplied by 8, the correction data has a resolution of 1 LSB value not a resolution of the sum of 8 LSB values.

As described above, correction data having a resolution of 1 LSB value can be calculated up to a region of long-exposure photography in which readout is performed a number of times (here, 32 times) exceeding a resolution of the correction data.

If the long-exposure flag is set, image data finally processed by an addition operation after completion of exposure is obtained, and correction data as multiplied by the number of times of addition during exposure is calculated.

At step S319, the system control circuit 50 rasterizes new correction data obtained as described above into the memory 30. Since a subtraction process is performed during a development process (to be described later) as in short-exposure photography, horizontal dark shading correction can be performed with a high degree of accuracy. After completing a series of photography operations, the system control circuit 50 ends this processing and returns to the main processing. That is, the system control circuit 50 proceeds to step S132 shown in FIG. 4.

In step S132, the system control circuit 50 reads out a part of image data written in a predetermined area of the memory 30 via the memory control circuit 22. Then, the system control circuit 50 performs a WB (white balance) integration operation process and an OB (optical black) integration operation process that are required to perform a development process. The system control circuit 50 stores results of the operations in an internal memory thereof or the memory 52.

The system control circuit 50 reads out captured image data written in the predetermined area of the memory 30 using the memory control circuit 22 and, if necessary, the image processing circuit 20. Then, the system control circuit 50 performs various development processes including an AWB (auto white balance) process, a gamma conversion process and a color conversion process using the operation results stored in the internal memory thereof or the memory 52 (step S132).

In the development process performed at step S132, the system control circuit 50 can also perform a dark correction operation for canceling dark current noise of the image sensor 14 and the like by performing subtraction using horizontal dark shading correction data rasterized at step S123 or S319.

When the correction operation is performed using the horizontal dark shading correction data as described above, image quality deterioration caused by horizontal dark current noise or fixed-pattern noise generated in the image sensor 14 can be corrected without performing any dark loading for a captured image.

The system control circuit 50 reads out image data written in the predetermined area of the memory 30, causes the compression/expansion circuit 32 to perform image compression according to the set compression mode, and writes the captured image data subjected to a series of processing operations into an empty image portion of the image storage buffer area of the memory 30 (step S133).

The system control circuit 50 then starts a recording process to read out image data stored in the image storage buffer area of the memory 30 and write the read-out image data into the recording medium 200 or 210, such as a memory card or Compactflash® card, via the interface 90 or 94 and the connector 92 or 96 (step S134). This recording process is performed for captured image data subjected to a series of processing operations each time the image data is newly written into an empty image portion of the image storage buffer area of the memory 30.

While image data is being written into the recording medium 200 or 210, the system control circuit 50 causes the indicator portion 54 to provide a recording medium writing indication, such as blinking of the LED, so as to indicate that writing is in progress.

Then, the system control circuit 50 returns to step S124, where the system control circuit 50 waits for the next photography. In this way, a series of processing operations associated with photography is completed.

In the electronic camera according to the present embodiment configured to perform processing as described above, when dark noise correction is performed at the time of short-exposure photography using horizontal dark shading correction data created and stored during adjustment in the manufacturing process, a shutter release time lag can be reduced, thus enabling high-quality image data to be obtained.

Furthermore, when long-exposure photography, in which a large dark current component is generated, is performed, readout is performed a plurality of times during an exposure operation so as to secure the sufficient dynamic range, and horizontal dark shading correction is appropriately performed using more accurately calculated correction data. Accordingly, an image satisfying both of high dynamic range and high image quality can be obtained.

Although a specific embodiment of the present invention has been described above, the present invention is not limited to the configuration of the embodiment, and is applicable to any configuration capable of achieving the functions presented in claims or the functions of the configuration of the embodiment.

For example, in the above-described embodiment, correction data is rasterized in the memory 30 when horizontal dark shading correction is performed. However, correction may also be performed without rasterization such that correction data is sequentially subtracted for every line from an original image while image data is loaded from the image sensor 14. In addition, correction may also be performed such that an image stored in the memory is once read out and then written into the memory again while correction data is subtracted from the image.

Also, in the above-described embodiment, rasterization (step S123) of horizontal dark shading correction data is performed after the first shutter switch 62 (SW1) is pressed. However, correction data may also be rasterized when the power supply of the camera is turned on.

In the above-described embodiment, calculation of correction data used for correction at the time of long-exposure photography is performed after completion of an exposure operation. However, if an exposure time is known in advance, calculation of correction data may also be performed before completion of an exposure operation or before start of an exposure operation.

Furthermore, although correction data is horizontal one-dimensional data in the above-described embodiment, correction data may also be vertical one-dimensional data or two-dimensional data calculated from images captured a plurality of times. For example, during the manufacturing process, a plurality of dark images are captured and correction data is calculated using the plurality of images. Accordingly, two-dimensional correction data having a precision of a decimal fraction part can be calculated.

Also, correction data need not be data of the whole of two-dimensional images. One-dimensional data in both the horizontal and vertical directions may be stored. When horizontal one-dimensional data is rasterized in the rasterization process (step S123) for correction data, dark shading in both the horizontal and vertical directions can be corrected by adjusting the amount of correction line by line using vertical one-dimensional data. FIG. 8 is a diagram illustrating correction of an original image using one-dimensional data in both the vertical and horizontal directions.

In the above-described embodiment, correction data is created and stored in the nonvolatile memory 56 during adjustment in the manufacturing process. However, correction data may also be created and stored by a user at any arbitrary timing performing a projection operation on at least one image obtained by dark photography.

Furthermore, in the above-described embodiment, a readout operation to be performed a plurality of times is selected depending on the time length of the shutter speed. However, the readout operation to be performed a plurality of times may also be selected depending on various conditions, such as ambient temperature or ISO sensitivity set for photography, in addition to the time length of the shutter speed.

The present invention can also be achieved by providing a system or apparatus with program code of software for implementing the functions of the above-described embodiment. In this case, the program code itself implements the functions of the embodiment.

In the above-described embodiment, program code shown in the flow charts of FIGS. 2 to 4, 6 and 7 is stored in a ROM (read-only memory). A recording medium for supplying the program code is not limited to a ROM but includes a flexible disk, a hard disk, a non-volatile memory card, etc.

Program code of software for implementing the functions of the above-described embodiment may be supplied to a computer (CPU or MPU (micro-processing unit)) of an apparatus or system connected to various devices so as to operate the various devices to implement the functions of the embodiment, and causing the various devices to operate in accordance with the program code stored in the computer of the system or apparatus.

In this case, the program code of software itself implements the functions of the above-described embodiment. The recording medium storing the program code includes, for example, a flexible disk, a hard disk, an optical disk, a magneto-optical disk, a CD-ROM (compact disk-ROM), a magnetic tape, a non-volatile memory card, a ROM, etc.

Furthermore, besides the program code supplied to the computer being executed to implement the functions of the above-described embodiment, the present invention includes the program code being executed in association with an OS (operating system), another application program or the like running on the computer to implement the functions of the above-described embodiment.

Moreover, the present invention can also include a CPU or the like contained in a function expansion board inserted into the computer or in a function expansion unit connected to the computer, the function expansion board or the function expansion unit having a memory in which the supplied program code is stored, the CPU or the like performing an actual process in whole or in part according to instructions of the program code to realize the functions of the above-described embodiment.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2004-124407 filed Apr. 20, 2004, which is hereby incorporated by reference herein.

What is claimed is:

1. An image capture apparatus comprising:
a quantization precision selection device configured to select a first quantization precision in a case where an operation for reading out image data from an image sensor is performed a plurality of times for one image capturing operation and to select a second quantization precision that is lower than the first quantization precision in a case where an operation for reading out the image data from the image sensor is performed once for one image capturing operation; and
an image data correction device configured to perform correction processing of the image data using correction data having one of the first and second quantization precisions selected by the quantization precision selection device.

2. An image capture apparatus according to claim 1, further comprising a changeover device configured to change an operation for reading out the image data from the image sensor according to a photographing condition.

3. An image capture apparatus according to claim 1, further comprising a changeover device configured to change an operation for reading out the image data from the image sensor according to a photographing environment.

4. An image capture apparatus according to claim 1, wherein, in a case where an operation for reading out the image data from the image sensor is performed a plurality of times for one image capturing operation, the image data correction device integrates image data that have been read out over a plurality of times, calculates correction data having the first quantization precision, and corrects the integrated image data using the correction data that was calculated.

5. An image capture method comprising:
  a quantization precision selection step of selecting a first quantization precision in a case where an operation for reading out image data from an image sensor is performed a plurality of times for one image capturing operation and selecting a second quantization precision that is lower than the first quantization precision in a case where an operation for reading out the image data from the image sensor is performed once for one image capturing operation; and
  an image data correction step of performing correction processing of the image data using correction data having one of the first and second quantization precisions selected by the quantization precision selection step.

6. An image capture method according to claim 5, further comprising a changeover step of changing an operation for reading out the image data from the image sensor according to a photographing condition.

7. An image capture method according to claim 5, further comprising a changeover step of changing an operation for reading out the image data from the image sensor according to a photographing environment.

8. An image capture method according to claim 5, wherein, in a case where an operation for reading out the image data from the image sensor is performed a plurality of times for one image capturing operation, the image data correction step integrates image data that have been read out over a plurality of times, calculates correction data having the first quantization precision, and corrects the integrated image data using the correction data that was calculated.

9. A computer program product stored on a computer readable medium for causing a computer to perform an image capture method according to claim 5.

10. A computer-readable recording medium having recorded thereon a computer program for causing a computer to perform an image capture method according to claim 5.

* * * * *